United States Patent
Mun et al.

(10) Patent No.: US 9,961,732 B2
(45) Date of Patent: May 1, 2018

(54) CONTROL CIRCUIT FOR LIGHTING APPARATUS

(71) Applicant: SILICON WORKS CO., LTD., Daejeon-si (KR)

(72) Inventors: Gyeong Sik Mun, Sejong-si (KR); Geon Soo Jang, Daejeon-si (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 0 days. days.

(21) Appl. No.: 15/439,151

(22) Filed: Feb. 22, 2017

(65) Prior Publication Data
US 2017/0251531 A1    Aug. 31, 2017

(30) Foreign Application Priority Data
Feb. 26, 2016   (KR) .................. 10-2016-0023402

(51) Int. Cl.
*H05B 37/02*    (2006.01)
*H05B 33/08*    (2006.01)

(52) U.S. Cl.
CPC .................. *H05B 33/083* (2013.01)

(58) Field of Classification Search
CPC ............ H05B 33/0803; H05B 33/0827; H05B 33/0809; H05B 33/0821; H05B 41/34; H05B 39/09; H05B 41/28; H05B 33/0815; H05B 33/0818; H05B 41/2828; H05B 41/3921; H05B 41/3927; H05B 37/029; H05B 37/0254; F21Y 2101/02
See application file for complete search history.

(56) References Cited

U.S. PATENT DOCUMENTS

| | | | |
|---|---|---|---|
| 8,324,840 B2 | 12/2012 | Shteynberg et al. | |
| 2012/0256550 A1* | 10/2012 | Akiyama | H05B 33/0824 315/187 |
| 2015/0382420 A1* | 12/2015 | Sakai | H05B 33/0803 315/193 |
| 2016/0007418 A1* | 1/2016 | Kim | H05B 33/0824 315/201 |
| 2016/0037599 A1* | 2/2016 | Kim | H05B 33/0812 315/161 |

FOREIGN PATENT DOCUMENTS

| | | |
|---|---|---|
| KR | 10-1353254 | 1/2014 |
| KR | 10-1440350 | 9/2014 |
| KR | 10-1521608 | 5/2015 |

* cited by examiner

*Primary Examiner* — Minh D A
(74) *Attorney, Agent, or Firm* — Kile Park Reed & Houtteman PLLC

(57) ABSTRACT

Disclosed is a control circuit for a lighting apparatus using an LED as a light source. The control circuit controls a driving current of a driving circuit, using a monitoring result for a rectified voltage and a monitoring result for an output voltage of a specific LED group among a plurality of LED groups.

11 Claims, 5 Drawing Sheets

CONTROL CIRCUIT FOR LIGHTING APPARATUS

BACKGROUND

1. Technical Field

The present disclosure relates to a lighting apparatus, and more particularly, to a control circuit for a lighting apparatus which uses an LED as a light source.

2. Related Art

A lighting apparatus is designed to use a light source which exhibits high light emission efficiency using a small amount of energy, in order to reduce energy consumption. Representative examples of the light source used in the lighting apparatus may include an LED. The LED is differentiated from other light sources in terms of various aspects such as energy consumption, lifetime, and light quality.

However, since the LED is driven by a current, a lighting apparatus using the LED as a light source requires a large number of additional circuits for current driving. In order to solve the above-described problem, an AC direct-type lighting apparatus has been developed.

The AC-direct type lighting apparatus is configured to convert an AC voltage into a rectified voltage, and drive a current using the rectified voltage such that the LED emits light. Since the AC direct-type lighting apparatus uses a rectified voltage without using an inductor and capacitor, the AC direct-type lighting apparatus has a satisfactory power factor. The rectified voltage indicates a voltage obtained by full-wave rectifying an AC voltage.

The AC direct-type lighting apparatus includes one or more LED groups, and each of the LED group includes one or more LEDs and emits light in response to a change of the rectified voltage.

The lighting apparatus is configured to form a current path corresponding to light emission of the LED group through a driving circuit implemented with an IC.

When a rectified voltage having a higher peak value than a design value is generated because the AC voltage is unstable, a large amount of driving current corresponding to the level of the rectified voltage flow through the current path of the driving circuit. As a result, the driving circuit may be overheated by the driving current corresponding to the rectified voltage having a high peak value.

The overheating of the driving circuit may hinder a stable operation of the lighting apparatus, and damage the driving circuit implemented with an IC. Therefore, current control for the lighting apparatus is needed to prevent the overheating of the driving circuit by a high rectified voltage.

SUMMARY

Various embodiments are directed to a control circuit for a lighting apparatus, which is capable of monitoring a peak value of a rectified voltage, limiting a driving current flowing in a driving circuit in response to a rise of the peak value, and reducing heat generation of the driving circuit implemented with an IC, thereby protecting the driving circuit.

Also, various embodiments are directed to a control circuit for a lighting apparatus, which is capable of monitoring a peak value of a rectified voltage and a surplus voltage of an LED group, limiting a driving current flowing in a driving circuit in response to rises of the peak value and the surplus voltage, and reducing heat generation of the driving circuit implemented with an IC, thereby protecting the driving circuit.

In an embodiment, there is provided a control circuit for a lighting apparatus which includes a plurality of LED groups connected in series to emit light using a rectified voltage. The control circuit may include: a first monitoring unit configured to provide a monitoring result as a first control signal, the monitoring result being obtained by monitoring the rectified voltage; a second monitoring unit configured to provide a monitoring result as a second control signal, the monitoring result being obtained by monitoring an output voltage of a specific LED group among the LED groups; a driving circuit configured to provide a current path for light emission to one of the plurality of LED groups by comparing an internal reference voltage and a sensing voltage, receive a control signal obtained by adding up the first and second control signals, and control heat generated by the driving current by adjusting the amount of driving current in the current path in response to the control signal; and a sensing resistor connected to the current path and configured to provide the sensing voltage.

In another embodiment, there is provided a control circuit for a lighting apparatus which includes a plurality of LED groups connected in series to emit light using a rectified voltage. The control circuit may include: a monitoring unit configured to provide a monitoring result as a control signal, the monitoring result being obtained by monitoring an output voltage of a specific LED group among the LED groups; a driving circuit configured to provide a current path for light emission to one of the plurality of LED groups by compare an internal reference voltage and a sensing voltage, and control heat generated by the driving current by adjusting the amount of driving current in the current path in response to the control signal; and a sensing resistor connected to the current path and configured to provide the sensing voltage.

According to the present embodiments, the control circuit can monitor the peak value of the rectified voltage and limit the driving current of the driving circuit in response to a rise of the peak value. Furthermore, the control circuit can monitor a surplus voltage of an LED group and limit the driving current corresponding to light emission of the LED group in response to a rise of the surplus voltage. Therefore, the control circuit can control the heat generation of the driving circuit implemented with an IC by the driving current based on the rectified voltage having a high peak value.

DETAILED DESCRIPTION

Figure 1:
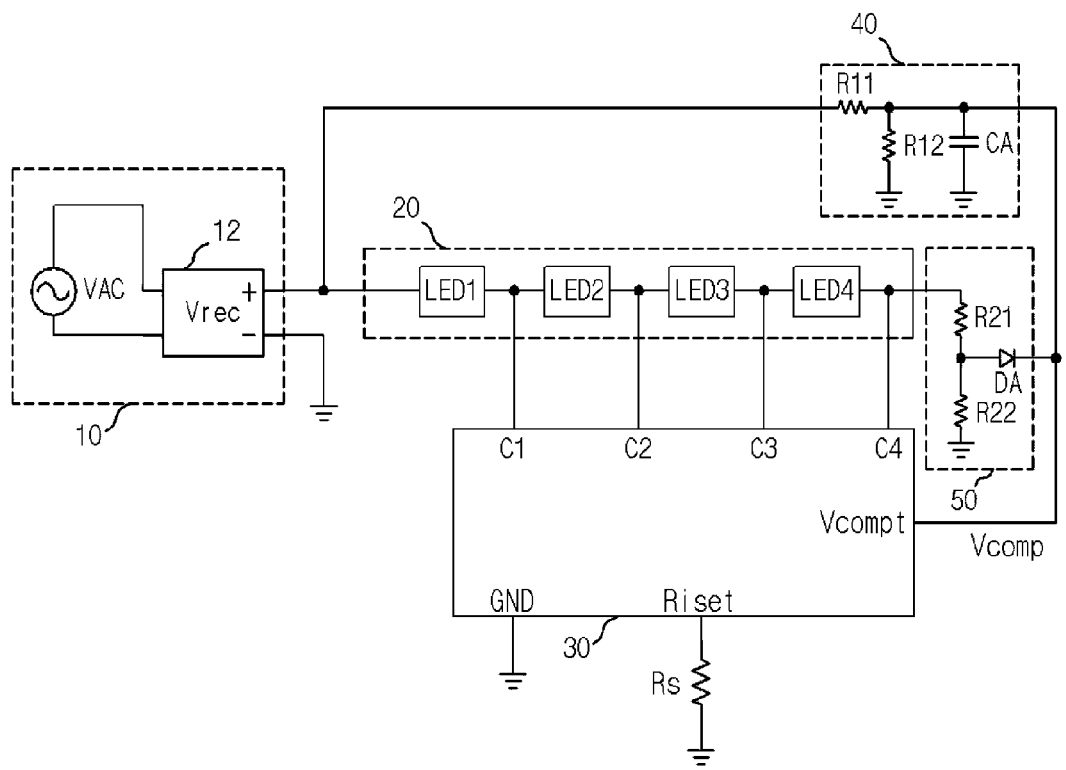
FIG. 1 is a block diagram illustrating a control circuit for a lighting apparatus according to an embodiment of the present invention.

Hereafter, embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

Referring to FIG. 1, a lighting apparatus according to an embodiment of the present invention may include a power supply unit 10, a lighting unit 20, a driving circuit 30, a first monitoring unit 40 and a second monitoring unit 50.

The power supply unit 10 is configured to provide a rectified voltage Vrec. For this operation, the power supply unit 100 may include an AC power supply VAC and a rectifier 12. The AC power supply VAC may include a commercial AC power supply, and provide an AC voltage. The rectifier 12 outputs a rectified voltage Vrec obtained by full-wave rectifying the AC voltage of the AC power supply VAC. The rectifier 12 may have a typical bridge diode structure.

The rectified voltage Vrec provided by the power supply unit 10 has a ripple corresponding to a half cycle of the AC voltage. In the present embodiment, a change of the rectified voltage Vrec may be defined as an increase/decrease of a ripple.

The lighting unit 20 emits light in response to the rectified voltage Vrec, and includes LEDs. The LEDs included in the lighting unit 20 may be divided into a plurality of LED groups. FIG. 1 exemplifies the lighting unit 20 including four LED groups LED1 to LED4 connected in series. The number of LED groups may be set to various values depending on a designer's intention.

Each of the LED groups LED1 to LED4 may include one or more LEDs or a plurality of LEDs connected in series, parallel or serial-parallel.

Each of the LEDs has a light emission voltage, and each of the LED groups has a light emission voltage having a level corresponding to the number of LEDs included therein.

The voltage at which the LED group LED1 emits light may be defined as a light emission voltage V1 of the LED group LED1, the voltage at which the LED groups LED1 and LED2 emit light may be defined as a light emission voltage V2 of the LED group LED2, the voltage at which the LED groups LED1 to LED3 emit light may be defined as a light emission voltage V3 of the LED group LED3, and the voltage at which the LED groups LED1 to LED4 emit light may be defined as a light emission voltage V4 of the LED group LED4.

When the rectified voltage Vrec rises, the number of LED groups that sequentially emit light increases, and when the rectified voltage Vrec falls, the number of LED groups that sequentially emit light decreases.

The driving circuit 30 provides a current path for light emission to one of the LED groups LED1 to LED4 by comparing an internal reference voltage and a sensing voltage and performs current regulation on a driving current of the current path.

For this operation, the driving circuit 30 includes terminals C1 to C4 connected to the respective output terminals of the LED groups LED1 to LED4 included in the lighting unit 20, and is connected to a sensing resistor Rs through a sensing resistor terminal Riset. A voltage applied to the sensing resistor Rs is referred to as a sensing voltage. The driving current flows through the sensing resistor Rs. The driving circuit 30 may be manufactured with one IC, and has a ground terminal GND and the sensing resistor terminal Riset connected to the sensing resistor Rs.

The driving circuit 30 uses the sensing voltage of the sensing resistor Rs in order to provide a current path. The driving circuit 30 compares the sensing voltage corresponding to the driving current flowing through the sensing resistor Rs to reference voltages which are internally provided in response to the respective LED groups LED1 to LED4. According to the comparison results between the sensing voltage and the reference voltages, the driving circuit 30 may selectively provide a current path between the sensing resistor Rs and the terminals C1 to C4.

The driving circuit 30 has a control terminal Vcompt for receiving a control signal Vcomp. The driving circuit 30 receives the control signal Vcomp corresponding to the sum of first and second control signals described later, and controls heat generation by adjusting the number of driving current Irec in the current path in response to the control signal Vcomp. The first control signal is provided to uniformly retain power, and the second control signal is provided to reduce power in response to a rise in output voltage of the LED group.

The first monitoring unit 40 is configured to monitor the peak value of the rectified voltage Vrec and output the first control signal. For this operation, the first monitoring unit 40 includes resistors R11 and R12 for dividing the rectified voltage Vrec and a capacitor CA charged with the voltage divided by the resistor R12. The charging voltage of the capacitor CA is provided as the first control signal.

When the peak value of the rectified voltage Vrec rises, the level of the charging voltage of the capacitor CA rises, and when the peak value of the rectified voltage Vrec falls, the level of the charging voltage of the capacitor CA falls. The capacitor CA provides a charging voltage obtained by monitoring the peak value of the rectified voltage of the previous cycle as the first control signal for current control to the control terminal Vcompt, the first control signal corresponding to the rectified voltage of the current cycle.

The second monitoring unit 50 provides a monitoring result as the second control signal, the monitoring result being obtained by monitoring a surplus voltage of a specific LED group among the LED groups LED1 to LED4.

In the present embodiment, the second monitoring unit 50 is configured to monitor a level change of a surplus voltage formed in response to light emission of the LED group LED4 that finally emits light in the lighting unit 20, and output the monitoring result as the second control signal.

For this operation, the second monitoring unit 50 includes resistors R21 and R22 for dividing the surplus voltage formed at the output terminal of the LED group LED4 and a diode DA located between the control terminal Vcompt and a node between the resistors R21 and R22. That is, a voltage applied to the resistor R22 is provided as the second control signal.

The surplus voltage is not formed before the LED group LED4 emits light, but has a level corresponding to "rectified voltage Vrec—light emission voltage V4" after the LED group LED4 emits light. When the peak value of the rectified voltage Vrec is changed, the peak value of the surplus voltage is also changed. That is, the surplus voltage follows the level change of the rectified voltage Vrec higher than the light emission voltage V4. The second monitoring unit 50 provides a monitoring result as the second control signal, the monitoring result being obtained by monitoring the change of the surplus voltage based on the current rectified voltage Vrec.

The first control signal of the first monitoring unit 40 and the second control signal of the second monitoring unit 50 are applied to the control terminal Vcompt of the driving circuit 30 through a common node. The driving circuit 30 receives the control signal Vcomp corresponding to the sum of the first and second control signals through the control terminal Vcompt.

The first control signal is expressed as a level of several V indicating a monitoring result for the rectified voltage which is changed in the range of 0V to several hundreds of V, and the second control signal is expressed as a level of several V indicating a monitoring result for the surplus voltage which is changed in the range of 0V to several tens of V. Therefore, the second control signal provides a monitoring result for a minute change of a high rectified voltage Vrec equal to or more than the light emission voltage V4.

The driving circuit 30 performs current control at a small scale according to the control signal Vcomp based on the first control signal, in response to the rectified voltage Vrec equal to or less than the light emission voltage V4. Furthermore, the driving circuit 30 performs current control at a large scale according to the control signal Vcomp obtained by adding up the first and second control signals, in response to the rectified voltage Vrec more than the light emission voltage V4.

In the present embodiment, the second monitoring unit 50 is configured to monitor the surplus voltage of the LED group LED4. However, the present embodiment is not limited thereto, but may be modified in such a manner that the second monitoring unit 50 monitors a voltage change after the LED groups LED2 and LED3 emit light, in consideration of the heating state of the driving circuit 30.

The driving circuit 30 of FIG. 1 may be described with reference to FIG. 2.

The driving circuit 30 includes a plurality of switching circuits 31 to 34 and a reference voltage supply unit 36. The plurality of switching circuits 31 to 34 provide a current path to the LED groups LED1 to LED4, and the reference voltage supply unit 36 provides the reference voltages VREF1 to VREF4.

The reference voltage supply unit 36 may be configured to provide the reference voltages VREF1 to VREF4 having different levels, depending on a designer's intention. The reference voltage supply unit 36 may receive the control signal Vcomp, and uniformly raise or lower the levels of the reference voltages VREF1 to VREF4 in response to a rise or fall in level of the control signal Vcomp.

The reference voltage supply unit 36 includes a plurality of resistors connected in series, for example, and the plurality of resistors connected in series are connected to the ground terminal GND to receive a constant voltage. The reference voltage supply unit 36 may be configured to provide the reference voltages VREF1 to VREF4 having different levels to the nodes between the respective resistors. In this case, the control signal Vcomp may be provided to the node for outputting the highest reference voltage Vref4, and control the whole reference voltages. Unlike the above-described configuration, the reference voltage supply unit 36 may include independent voltage supply sources to provide the reference voltages VREF1 to VREF4 having different levels. In this case, the control signal Vcomp may be individually or commonly provided to the voltage supply sources, and control the reference voltages.

Among the reference voltages VREF1 to VREF4 having different levels, the reference voltage VREF1 has the lowest voltage level, and the reference voltage VREF4 has the highest voltage level. The levels of the reference voltages VREF1 to VREF4 may be set in ascending order.

The reference voltage VREF1 has a level for turning off the switching circuit 31 at a point of time that the LED group LED2 emits light. More specifically, the reference voltage VREF1 may be set to a lower level than the sensing voltage formed in the sensing resistor Rs at a point of time that the LED group LED2 emits light.

The reference voltage VREF2 has a level for turning off the switching circuit 32 at a point of time that the LED group LED3 emits light. More specifically, the reference voltage VREF2 may be set to a lower level than the sensing voltage formed in the sensing resistor Rs at a point of time that the LED group LED3 emits light.

The reference voltage VREF3 has a level for turning off the switching circuit 33 at a point of time that the LED group LED4 emits light. More specifically, the reference voltage VREF3 may be set to a lower level than the sensing voltage formed in the sensing resistor Rs at a point of time that the LED group LED4 emits light.

The reference voltage VREF4 may be set in the upper limit level region of the rectified voltage Vrec such that a current flowing through the sensing resistor Rs becomes a constant current.

The switching circuits 31 to 34 are commonly connected to the sensing resistor Rs for providing the sensing voltage, in order to perform current regulation and form a current path.

The switching circuits 31 to 34 compare the sensing voltage of the sensing resistor Rs to the reference voltages VREF1 to VREF4 of the reference voltage supply unit 36, and form a current path for light emission of the lighting unit 20.

Each of the switching circuits 31 to 34 receives a high-level reference voltage as the switching circuit is connected to an LED group remote from the position where the rectified voltage Vrec is applied.

The switching circuits 31 to 34 include comparators 38a to 38d and switching elements, respectively. The switching elements may be implemented with NMOS transistors 39a to 39d, respectively.

Each of the comparators 38a to 38d of the respective switching circuits 31 to 34 includes a positive input terminal (+) configured to receive a reference voltage, a negative input terminal (−) configured to receive a sensing voltage, and an output terminal configured to output a comparison result between the reference voltage and the sensing voltage.

The NMOS transistors 39a to 39d of the switching circuits 31 to 34 perform a switching operation according to outputs of the respective comparators 38a to 38d, applied to the gates thereof. The drains of the respective NMOS transistors 39a to 39d and the negative input terminals (−) of the respective comparators 38a to 38d are connected to the sensing resistor Rs in common.

According to the above-described configuration, the sensing resistor Rs may apply the sensing voltage to the input terminals (−) of the respective comparators 38a to 38d, and provide current paths corresponding to the NMOS transistors 39a to 39d of the respective switching circuits 31 to 34.

In the above-described lighting apparatus, the LED groups LED1 to LED4 may sequentially emit light in response to the changes of the rectified voltage Vrec, and current paths corresponding to the sequential light emissions of the LED groups LED1 to LED4 may be provided through the driving circuit 30.

Figure 2:
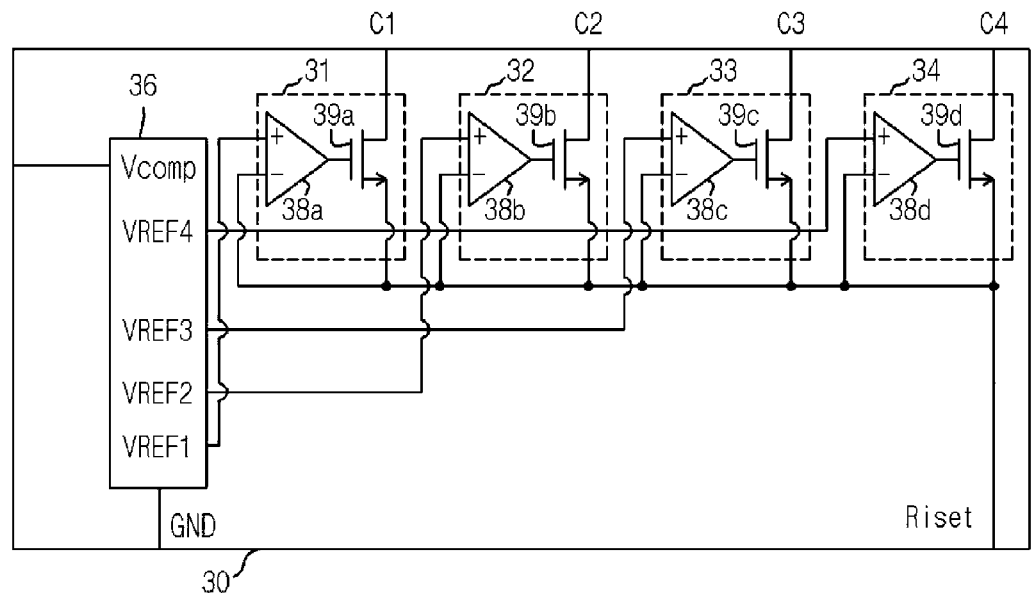
FIG. 2 is a detailed circuit diagram of a driving circuit of FIG. 1.
Figure 3:
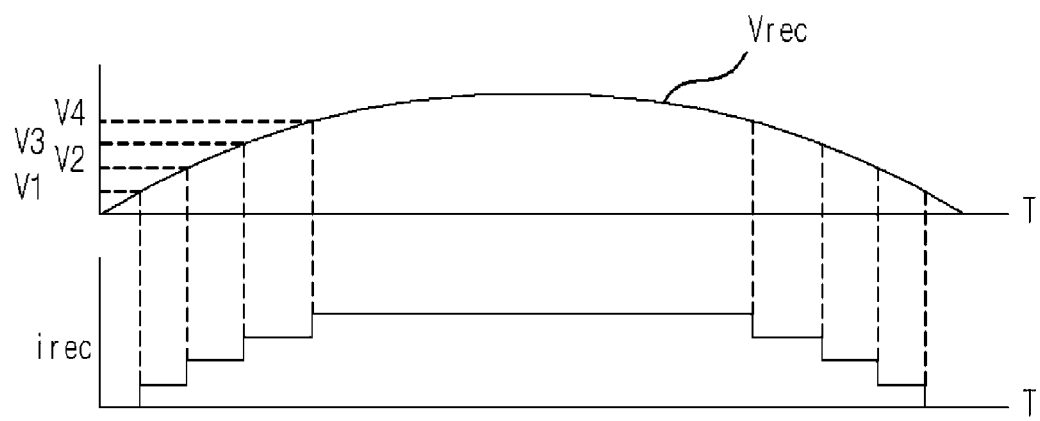
FIG. 3 is a waveform diagram illustrating changes of a driving current corresponding to changes of a one-cycle rectified voltage.

When the peak value of the rectified voltage Vrec retains a stable level, the embodiment of FIGS. 1 and 2 may be operated as illustrated in FIG. 3.

When the rectified voltage Vrec is in the initial state, the switching circuits 31 to 34 all retain a turn-on state, because the reference voltages VREF1 to VREF4 applied to the positive input terminals (+) thereof are higher than the sensing voltage across the sensing resistor Rs, the sensing voltage being applied to the negative input terminals (−) thereof When the rectified voltage Vrec is in the initial state, the LED groups LED1 to LED4 do not emit light.

Then, when the rectified voltage Vrec rises to reach the light emission voltage V1, the LED group LED1 emits light. When the LED group LED1 of the lighting unit 20 emits light, the switching circuit 31 connected to the LED group LED1 provides a current path for light emission.

When the rectified voltage Vrec reaches the light emission voltage V1 such that the LED group LED1 emits light and the current path is formed through the switching circuit 31, the driving current Irec having increased to a predetermined level flows through the current path formed by the switching circuit 31.

Then, while the rectified voltage Vrec rises to the light emission voltage V2, the switching circuit 31 performs a current regulation operation using the sensing voltage formed at the sensing resistor Rs, and the driving current flowing through the switching circuit 31 retains a constant current.

When the rectified voltage Vrec reaches the light emission voltage V2, the LED group LED2 emits light. When the LED group LED2 of the lighting unit 20 emits light, the switching circuit 32 connected to the LED group LED2 provides a current path for light emission.

When the rectified voltage Vrec reaches the light emission voltage V2 such that the LED group LED2 emits light and the current path is formed through the switching circuit 32, the level of the sensing voltage of the sensing resistor Rs rises. The level of the sensing voltage at this time is higher tan the reference voltage VREF1.

Thus, the NMOS transistor 39a of the switching circuit 31 is turned off by an output of the comparator 38a. That is, the switching circuit 31 is turned off, and the switching circuit 32 provides the current path corresponding to the light emission of the LED group LED2. At this time, the LED group LED1 also maintains the light emitting state, and the level of the driving current Irec flowing through the switching circuit 32 rises.

Then, while the rectified voltage Vrec rises to the light emission voltage V3, the switching circuit 32 performs a current regulation operation using the sensing voltage formed at the sensing resistor Rs, and the driving current flowing through the switching circuit 32 retains a constant current.

When the rectified voltage Vrec reaches the light emission voltage V3, the LED group LED3 emits light. When the LED group LED3 emits light, the switching circuit 33 connected to the LED group LED3 provides a current path for light emission.

When the rectified voltage Vrec reaches the light emission voltage V3 such that the LED group LED3 emits light and the current path is formed through the switching circuit 33, the level of the sensing voltage of the sensing resistor Rs rises. The level of the sensing voltage at this time is higher tan the reference voltage VREF2.

Thus, the NMOS transistor 39b of the switching circuit 32 is turned off by an output of the comparator 38b. That is, the switching circuit 32 is turned off, and the switching circuit 33 provides the current path corresponding to the light emission of the LED group LED3. At this time, the LED groups LED1 and LED2 also maintain the light emitting state, and the level of the driving current Irec flowing through the switching circuit 32 rises.

Then, while the rectified voltage Vrec rises to the light emission voltage V4, the switching circuit 33 performs a current regulation operation using the sensing voltage formed at the sensing resistor Rs, and the driving current flowing through the switching circuit 33 retains a constant current.

Then, when the rectified voltage Vrec continuously rises to reach the light emission voltage V4, the LED group LED4 emits light. When the LED group LED4 emits light, the switching circuit 34 connected to the LED group LED4 provides a current path for light emission.

When the rectified voltage Vrec reaches the light emission voltage V4 such that the LED group LED4 emits light and the current path is formed through the switching circuit 34, the level of the sensing voltage of the sensing resistor Rs rises. The level of the sensing voltage at this time is higher tan the reference voltage VREF3.

Therefore, the NMOS transistor 39c of the switching circuit 33 is turned off by an output of the comparator 38c. That is, the switching circuit 33 is turned off, and the switching circuit 34 provides the current path corresponding to the light emission of the LED group LED4. At this time, the LED groups LED1 to LED3 also maintain the light emitting state, and the level of the driving current Irec flowing through the switching circuit 34 rises.

When the rectified voltage Vrec rises after the LED group LED4 emits light, the rectified voltage Vrec may become an over-voltage. In response to the rise of the rectified voltage Vrec, the output voltage of the LED group LED3 also rises.

Then, while the rectified voltage Vrec falls to the light emission voltage V4 after rising to the peak value, the switching circuit 34 performs a current regulation operation using the sensing voltage formed at the sensing resistor Rs, and the driving current flowing through the switching circuit 34 retains a constant current.

Then, when the rectified voltage Vrec decreases, the switching circuits 34 to 31 connected to the LED groups LED4 to LED1 are sequentially turned off, and the LED groups LED4 to LED1 are sequentially turned off.

Figure 4:
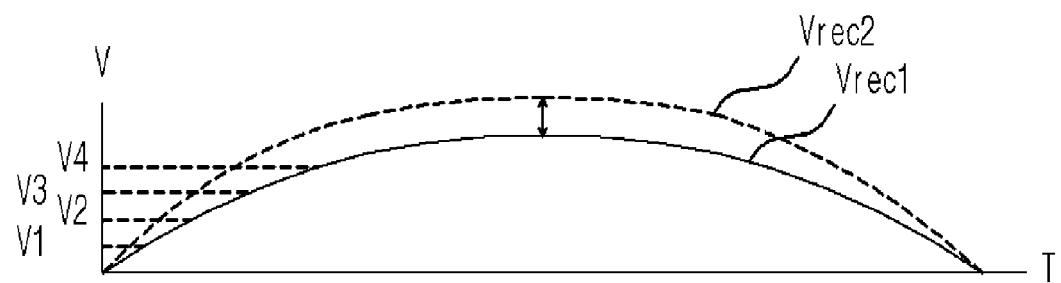
FIG. 4 is a waveform diagram illustrating rectified voltages having different peak values.
Figure 5:
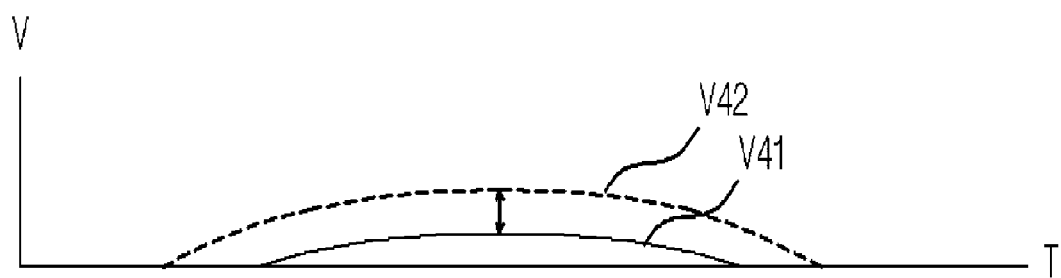
FIG. 5 is a waveform diagram illustrating surplus voltages formed by rectified voltages having different peak values.

When the peak value of the rectified voltage Vrec rises from Vrec1 to Vrec2 as illustrated in FIG. 4, a surplus voltage formed after the light emission of the LED group LED4 rises from V41 to V42 as illustrated in FIG. 5.

When the peak value of the rectified voltage Vrec rises from Vrec1 to Vrec2, the amount of current on the current path of the driving circuit 30 increases by the rise of the peak value, and the heat generation of the driving circuit 30 increases.

According to the present embodiment, the increase of the heat generation is controlled by the operations of the first and second monitoring units 40 and 50.

Figure 6:
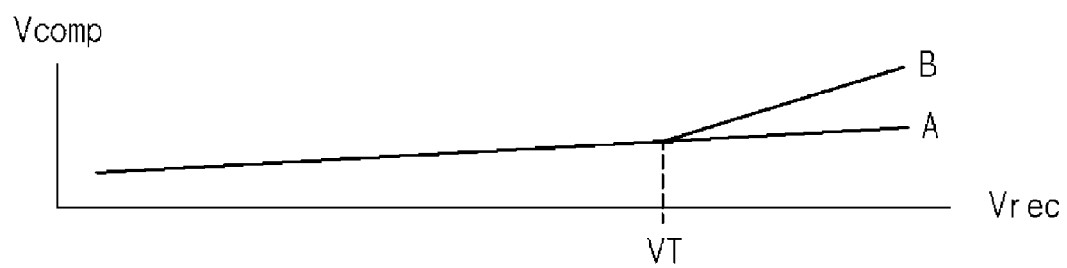
FIG. 6 is a graph illustrating the relationship between a control signal Vcomp and the peak value of a rectified voltage.

Referring to FIG. 6, the first monitoring unit 40 provides a first control signal A which gradually increases in response to changes in peak value of the rectified voltage Vrec, and the second monitoring unit 50 provides a second control signal B which increases to a larger value than the first control signal A after the light emission of the LED group LED4.

The control signal Vcomp corresponding to the sum of the first and second control signals A and B is provided to the reference voltage supply unit 36 of the driving circuit 30. When the rectified voltage Vrec is high (Vrec2), the reference voltages VREF1 to VREF4 are formed at high levels, and when the rectified voltage Vrec is low (Vrec1), the reference voltages VREF1 to VREF4 are formed at low levels.

Figure 7:
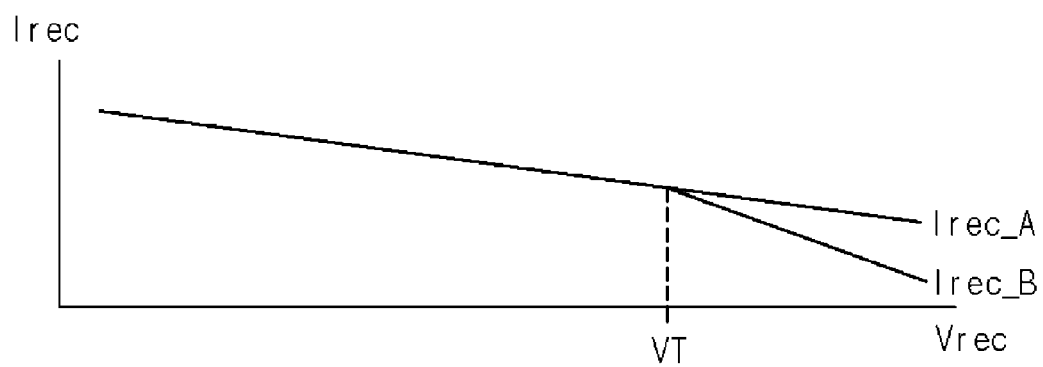
FIG. 7 is a graph illustrating the relationship between the driving current and the peak value of the rectified voltage.

The points of time that the switching circuits 31 to 34 are turned on are controlled by the reference voltages VREF1 to VREF4 having risen to high levels, and the amount of driving current Irec flowing through the switching circuits 31 to 34 decreases. That is, when the rectified voltage Vrec rises, the amount of driving current Irec on the current path of the driving circuit 30 decreases as indicated by Irec_A of FIG. 7.

In particular, when the second control signal B is provided after the light emission of the LED group LED4 and increases to a larger value than the first control signal A, the reference voltages VREF1 to VREF4 further rise, and the amount of driving current Irec flowing through the switching circuit 34 further decreases. That is, in response to the change of the rectified voltage Vrec higher than the light emission voltage V4, the amount of driving current Irec on the current path of the driving circuit 30 decreases as indicated by Irec_B of FIG. 7.

Figure 8:
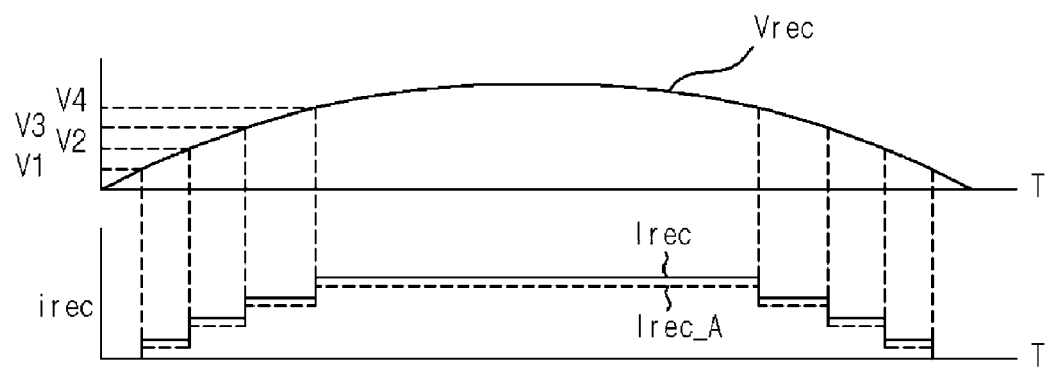
FIG. 8 is a waveform diagram illustrating changes of the driving current when the control signal Vcomp is decided by the first control signal.

When the control signal Vcomp is decided by the first control signal A, the driving current Irec may decrease to a driving current Irec_A in response to the change of the one-cycle rectified voltage Vrec, as illustrated in FIG. 8. Furthermore, when the control signal Vcomp is decided by the first and second control signals A and B, the driving current Irec may decrease to a driving current Irec_B in response to the change of the one-cycle rectified voltage Vrec, as illustrated in FIG. 9.

Figure 9:
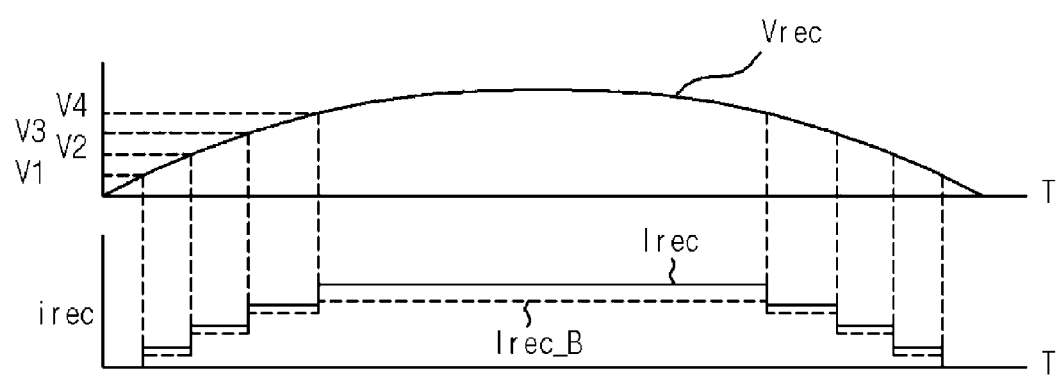
FIG. 9 is a waveform diagram illustrating changes of the driving current when the control signal Vcomp is decided by the first and second control signals.

FIG. 8 and FIG. 9 show that the decrease from the driving current Irec to the driving current Irec_B at the rectified voltage Vrec higher than the light emission voltage V4 is larger than the decrease from the driving current Irec to the driving current Irec_A.

The control circuit for the light apparatus according to the present embodiment may monitor the peak value of the rectified voltage, and limit a driving current corresponding to light emission of an LED group in response to a rise of the peak value. Furthermore, the control circuit may monitor a surplus voltage of an LED group, and limit a driving current corresponding to light emission of the LED group in response to a rise of the surplus voltage. Therefore, the control circuit can reduce the heat generation of the driving circuit manufactured with an IC in response to the rise in peak value of the rectified voltage Vrec, thereby protecting the driving circuit.

While various embodiments have been described above, it will be understood to those skilled in the art that the embodiments described are by way of example only. Accordingly, the disclosure described herein should not be limited based on the described embodiments.

What is claimed is:

1. A control circuit for a lighting apparatus which includes a plurality of LED groups connected in series to emit light using a rectified voltage, the control circuit comprising:

a first monitoring unit configured to provide a monitoring result as a first control signal, the monitoring result being obtained by monitoring the rectified voltage;

a second monitoring unit configured to provide a monitoring result as a second control signal, the monitoring result being obtained by monitoring an output voltage of a specific LED group among the LED groups;

a driving circuit configured to provide a current path for light emission to one of the plurality of LED groups by comparing an internal reference voltage and a sensing voltage, receive a control signal obtained by adding up the first and second control signals, and control heat generated by the driving current by adjusting the amount of driving current in the current path in response to the control signal; and a sensing resistor connected to the current path and configured to provide the sensing voltage.

2. The control circuit of claim 1, wherein the first control signal is provided to uniformly retain power, and the second control signal is provided to reduce power in response to a rise in output voltage of the LED group.

3. The control circuit of claim 1, wherein the first monitoring unit provides a monitoring result as the first control signal, the monitoring result being obtained by monitoring the peak value of the rectified voltage.

4. The control circuit of claim 3, wherein the first control signal is a monitoring result being obtained by monitoring the rectified voltage at the previous cycle.

5. The control circuit of claim 1, wherein the first monitoring unit comprises a capacitor charged with a voltage obtained by dividing the rectified voltage, and provides the charging voltage of the capacitor as the first control signal.

6. The control circuit of claim 1, wherein the second monitoring unit provides a monitoring result as the second control signal, the monitoring result being obtained by monitoring a surplus voltage of the LED group that finally emits light.

7. The control circuit of claim 1, wherein the driving circuit adjusts the amount of driving current by changing the level of the reference voltage in response to a change of the control signal.

8. The control circuit of claim 1, wherein the driving circuit comprises:

a reference voltage supply unit configured to supply reference voltages having different levels corresponding to the respective LED groups, and change the levels of the reference voltages in response to changes of the control signal; and switching circuits configured to compare the sensing voltage to the reference voltages for the respective LED groups, and provide the current path for light emission to one of the plurality of LED groups.

9. A control circuit for a lighting apparatus which includes a plurality of LED groups connected in series to emit light using a rectified voltage, the control circuit comprising:

a monitoring unit configured to provide a monitoring result as a control signal, the monitoring result being obtained by monitoring an output voltage of a specific LED group among the LED groups;

a driving circuit configured to change the level of an internal reference voltage in response to a change of the control signal, provide a current path for light emission to one of the plurality of LED groups by comparing the internal reference voltage and a sensing voltage, and control heat generated by the driving current by adjusting the amount of driving current in the current path in response to changing of the internal reference voltage; and a sensing resistor connected to the current path and configured to provide the sensing voltage.

10. The control circuit of claim 9, wherein the control signal is provided to reduce power in response to a rise in output voltage of the LED group.

11. The control circuit of claim 9, wherein the monitoring unit provides a monitoring result as the control signal, the monitoring result being obtained by monitoring a surplus voltage of the LED group that finally emits light.

\* \* \* \* \*